(12) United States Patent
Wang et al.

(10) Patent No.: US 10,276,839 B2
(45) Date of Patent: Apr. 30, 2019

(54) RECHARGEABLE BATTERY

(71) Applicants: Pei-Lun Wang, Keelung (TW);
Xinping Luo, Hengnan County (CN)

(72) Inventors: Pei-Lun Wang, Keelung (TW);
Xinping Luo, Hengnan County (CN)

( * ) Notice: Subject to any disclaimer, the term of this patent is extended or adjusted under 35 U.S.C. 154(b) by 353 days.

(21) Appl. No.: 15/134,385

(22) Filed: Apr. 21, 2016

(65) Prior Publication Data

US 2016/0336551 A1 Nov. 17, 2016

(30) Foreign Application Priority Data

May 13, 2015 (TW) .............................. 104115161 A

(51) Int. Cl.
*H01M 2/04* (2006.01)
*H01R 35/04* (2006.01)
*H01M 10/46* (2006.01)
*H01M 10/42* (2006.01)
*H01M 2/20* (2006.01)
*H01M 2/10* (2006.01)
*H01M 2/06* (2006.01)

(52) U.S. Cl.
CPC ........... *H01M 2/06* (2013.01); *H01M 2/0404* (2013.01); *H01M 2/0456* (2013.01); *H01M 2/1022* (2013.01); *H01M 2/20* (2013.01); *H01M 10/425* (2013.01); *H01M 10/4257* (2013.01); *H01M 10/46* (2013.01); *H01R 35/04* (2013.01); *H01M 2220/30* (2013.01)

(58) Field of Classification Search
CPC ........ H01M 2/06; H01M 2/20; H01M 2/0456; H01M 2/0404; H01M 2/1022; H01M 10/4257; H01M 10/425; H01M 10/46; H01M 2220/30; H01R 35/04
See application file for complete search history.

(56) References Cited

U.S. PATENT DOCUMENTS

2007/0273327 A1    11/2007   Daniel et al.
2011/0039130 A1*   2/2011    Baek ..................... H01M 10/42
                                                                 429/7

FOREIGN PATENT DOCUMENTS

GB          2351179 A        12/2000
JP          2013509154 A     3/2013
KR          20070101254 A    10/2007
KR          20080003040 U    8/2008

* cited by examiner

*Primary Examiner* — Eugenia Wang
(74) *Attorney, Agent, or Firm* — Chun-Ming Shih; HDLS IPR Services

(57) ABSTRACT

A rechargeable battery includes a battery body and a connector plug. The battery body has a recess, a circuit board and a cell. The circuit board is electrically connected to the battery cell. The connector plug is pivotally connected to the battery body and electrically connected to the circuit board. The connector plug is foldable to be received in the recess. Accordingly, the connector plug is pivotally connected to the battery body and is foldable to be received in the recess, so the battery body can be charged by means of the connector plug connected to an external power supply, thereby improving convenience in using the rechargeable battery.

5 Claims, 12 Drawing Sheets

RECHARGEABLE BATTERY

TECHNICAL FIELD

The present invention relates to a battery structure and, in particular, to a rechargeable battery.

BACKGROUND

In modern times, people highly rely on portable electronic products such as cellular phones and tablet computers. In order that the portable electronic product can work for a long time, a rechargeable battery is additionally prepared. When the rechargeable battery is electrically coupled to the portable electronic product, the rechargeable battery charges the portable electronic product by using the electric power stored inside the rechargeable battery.

However, since the rechargeable battery has limited power capacity, the rechargeable battery needs a charger to maintain sufficient power after running out of battery power. Therefore, if losing the charger, the rechargeable battery cannot be charged. When going outside, it is troublesome and inconvenience since a user has to bring a charger additionally.

Accordingly, the inventor made various studies to solve the above-mentioned defects, on the basis of which the present invention is accomplished.

SUMMARY

It is an object of the present invention to provide a rechargeable battery which utilizes a connector plug pivotally connected to a battery body and foldable to be received in a recess, and thereby the battery body can be charged by means of the connector plug connected to an external power supply, thus improving convenience in using the rechargeable battery.

Accordingly, the present invention provides a rechargeable battery, comprising: a battery body, the battery body including a recess, a circuit board and a cell being disposed inside the battery body, the circuit board being electrically connected to the cell; and a connector plug pivotally connected to the battery body and electrically connected to the circuit board, the connector plug being foldable to be received in the recess.

BRIEF DESCRIPTION OF THE DRAWINGS

The disclosure will become more fully understood from the detailed description and the drawings given herein below is for illustration only, and thus does not limit the disclosure, wherein.

DETAILED DESCRIPTION

Figure 1:
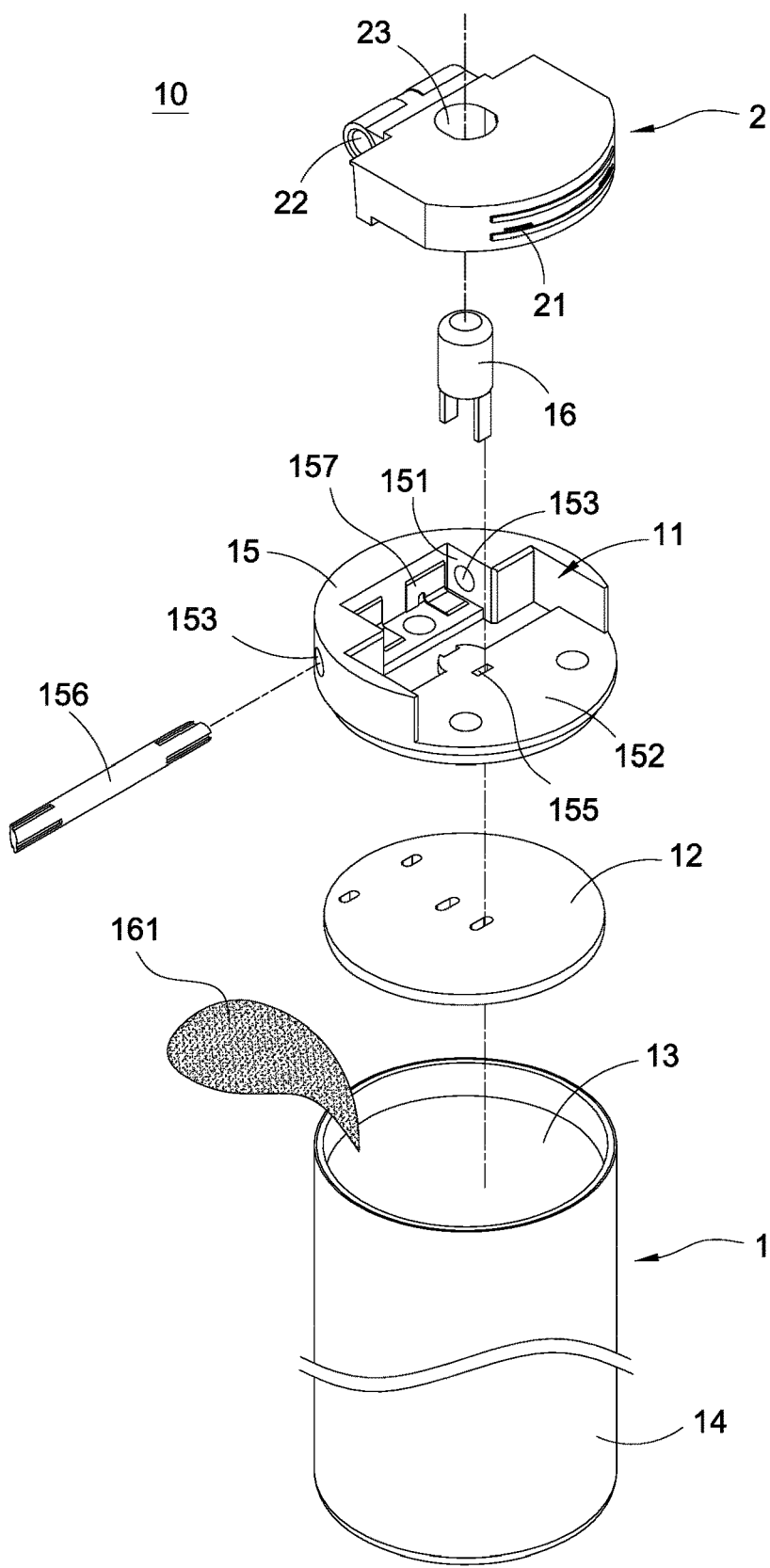
FIG. 1 is a perspective exploded view of a rechargeable battery according to the first embodiment of the present invention.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Please refer to FIGS. 1 to 8 showing a rechargeable battery 10 according to the first and second embodiments of the present invention. The rechargeable battery includes a battery body 1 and a connector plug 2.

Referring to FIGS. 1 to 6, the battery body 1 includes a recess 11, a circuit board 12 and a cell 13 are disposed inside the battery body 1, and the circuit board 12 is electrically connected to the cell 13.

In detail, the battery body 1 includes a sleeve 14 and a cover 15, the circuit board 12 and the cell 13 are accommodated in the sleeve 14, the cover 15 is fitted on the sleeve 14 and covers the circuit board 12 and the cell 13, and the recess 11 is openly disposed on the cover 15. The cover 15 includes an inner wall 151 and a bottom 152 corresponding to the recess 11, the inner wall 151 includes a first pivot hole 153, the bottom 152 includes a plurality of through holes 154 and a vent 155.

The cover 15 includes a pivot shaft 156 and a plurality of conductive plates 157. Each of the conductive plates 157 is fixedly inserted through each of the through holes 154 and electrically connected to the circuit board 12.

Referring to FIGS. 1 to 6, the connector plug 2 is pivotally connected to the battery body 1 and electrically connected to the circuit board 12. The connector plug 2 is foldable to be received in the recess 11. The connector plug 2 can be a universal serial bus (USB) plug or a high-definition multimedia interface (HDMI) plug.

To be specific, the connector plug 2 includes a plurality of conductive terminals 21, a second pivot hole 22, and an opening 23. The pivot shaft 156 is pivotally connected to the first pivot hole 153 and the second pivot hole 22. An end of each of the conductive plates 157 is disposed corresponding to each of the conductive terminals 21 and electrically connectable to each of the conductive terminals 21.

Referring to FIGS. 1 to 6, the battery body 1 further includes an electrode cap 16. The electrode cap 16 is fixedly inserted through the vent 155 and electrically connected to the circuit board 12. When the connector plug 2 is folded to be received in the recess 11, the electrode cap 16 is inserted through and protrudes from the opening 23.

Figure 4:
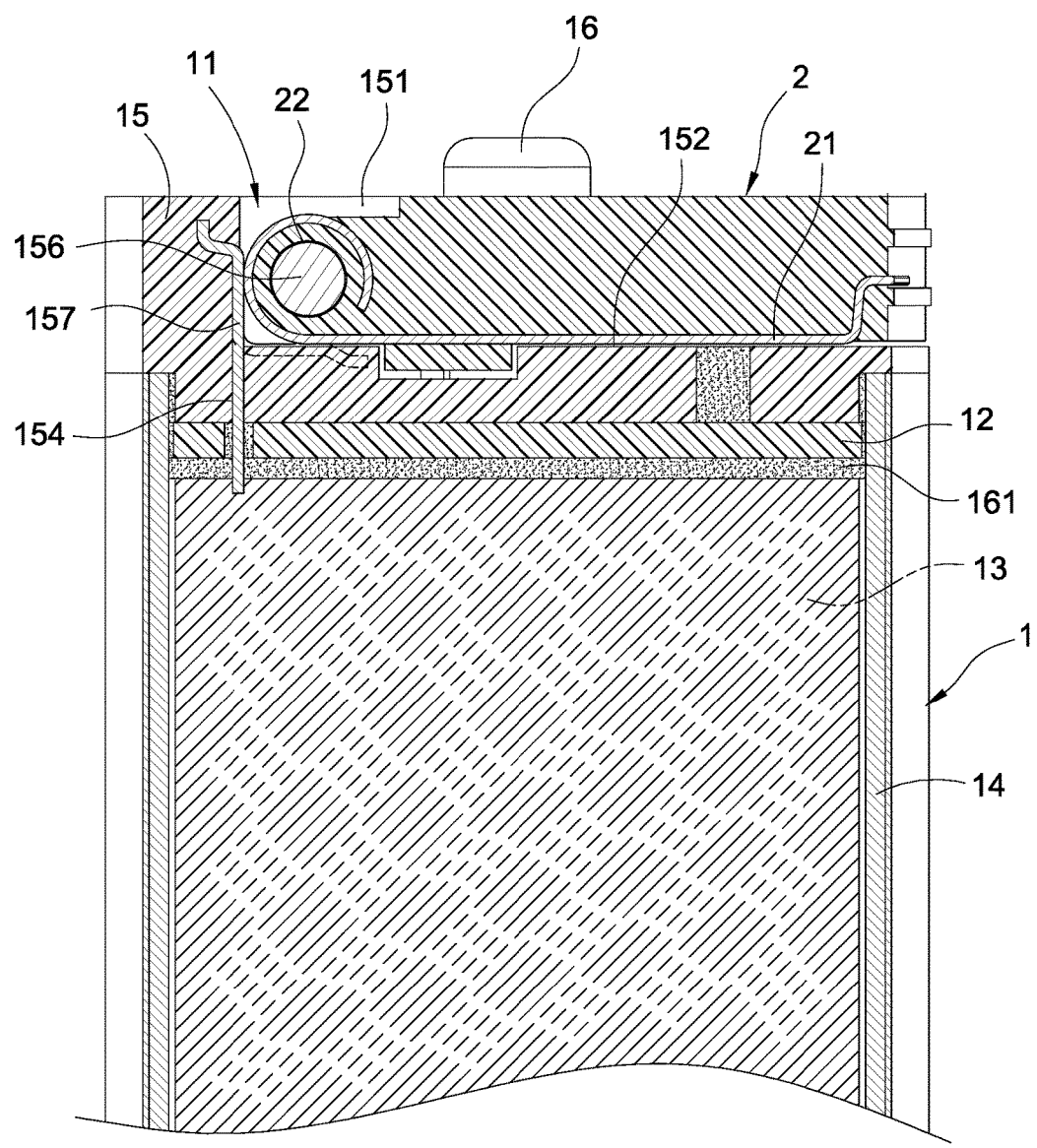
FIG. 4 is a cross-sectional view showing the rechargeable battery according to the first embodiment of the present invention.
Figure 5:
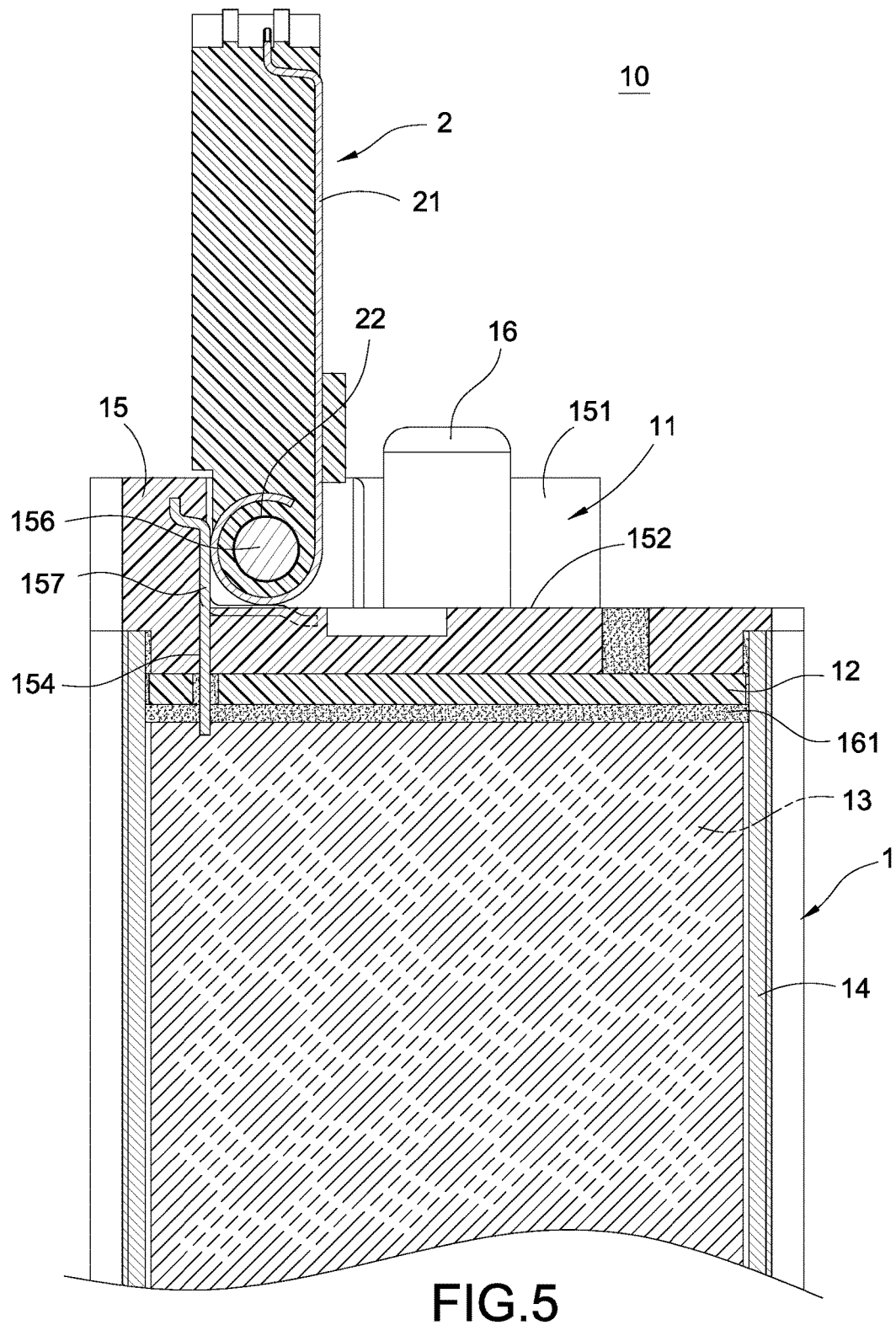
FIG. 5 is another cross-sectional view showing the rechargeable battery according to the first embodiment of the present invention.

Referring to FIGS. 4 and 5, the battery body 1 further includes a sealant 161; the sealant 161 is filled between the circuit board 12 and the cell 13, and the sealant 161 and the sleeve 14 together seal the cell 13.

Figure 6:
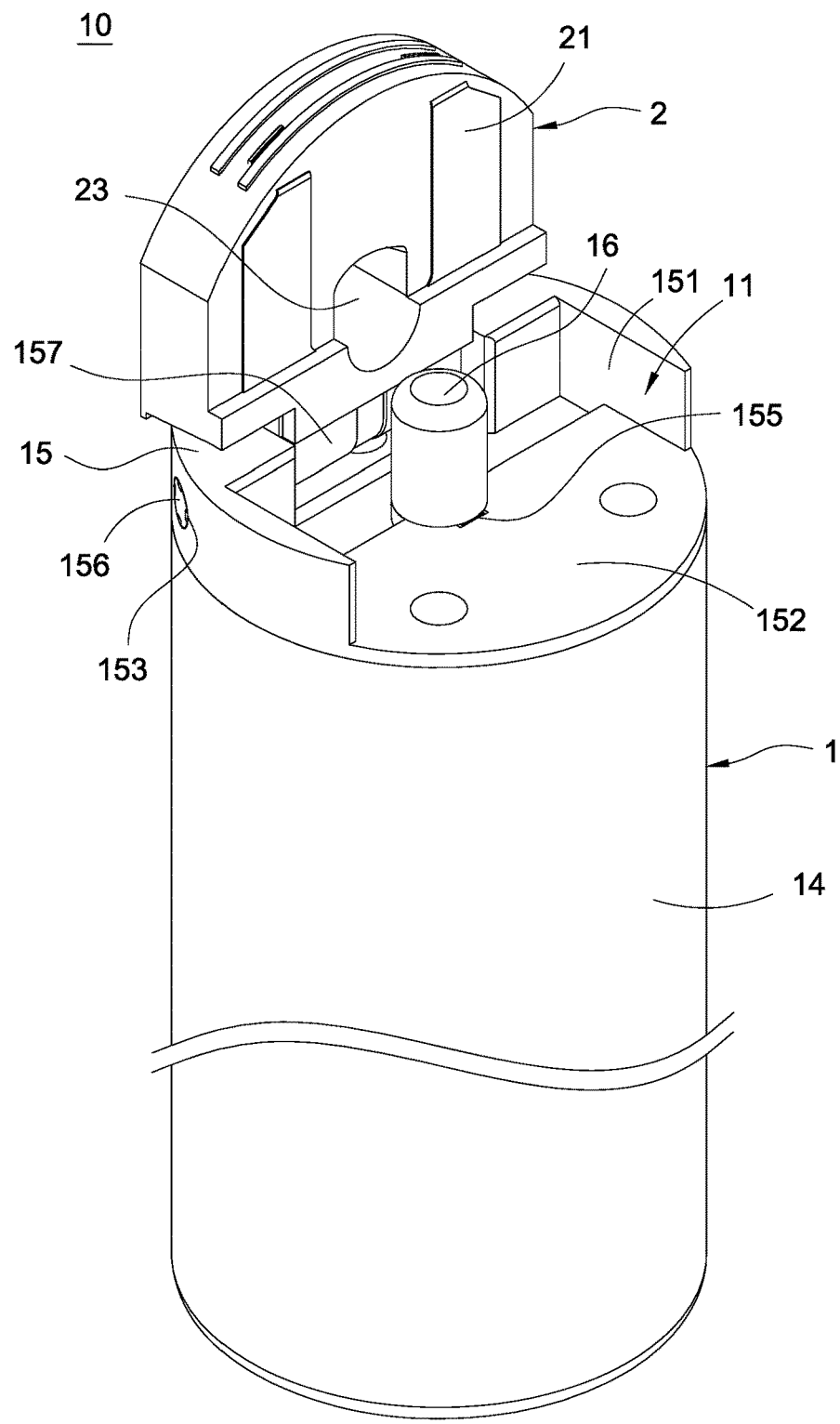
FIG. 6 is a schematic view showing the rechargeable battery in use according to the first embodiment of the present invention.
Figure 7:
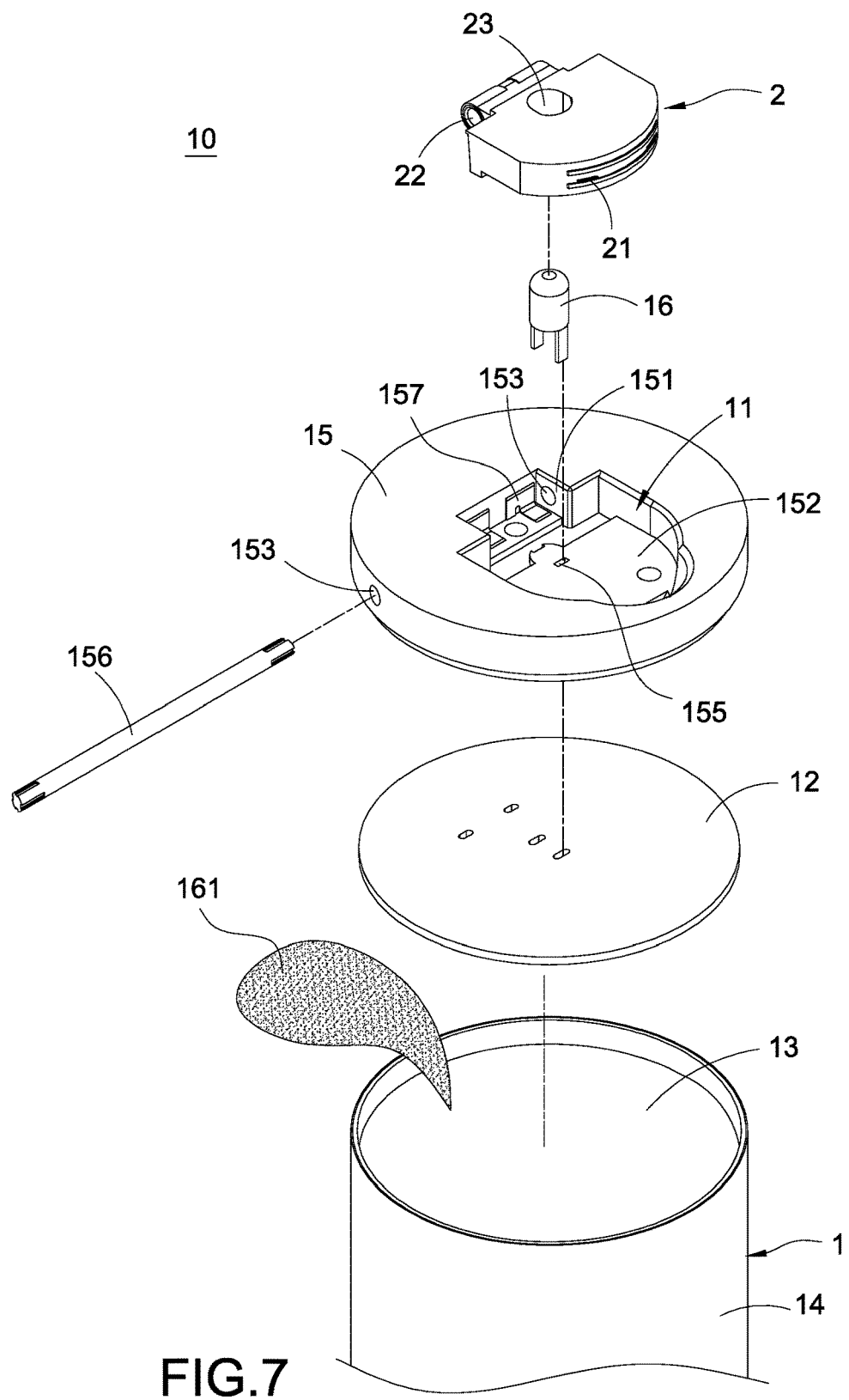
FIG. 7 is a perspective exploded view showing the rechargeable battery according to the second embodiment of the present invention.
Figure 8:
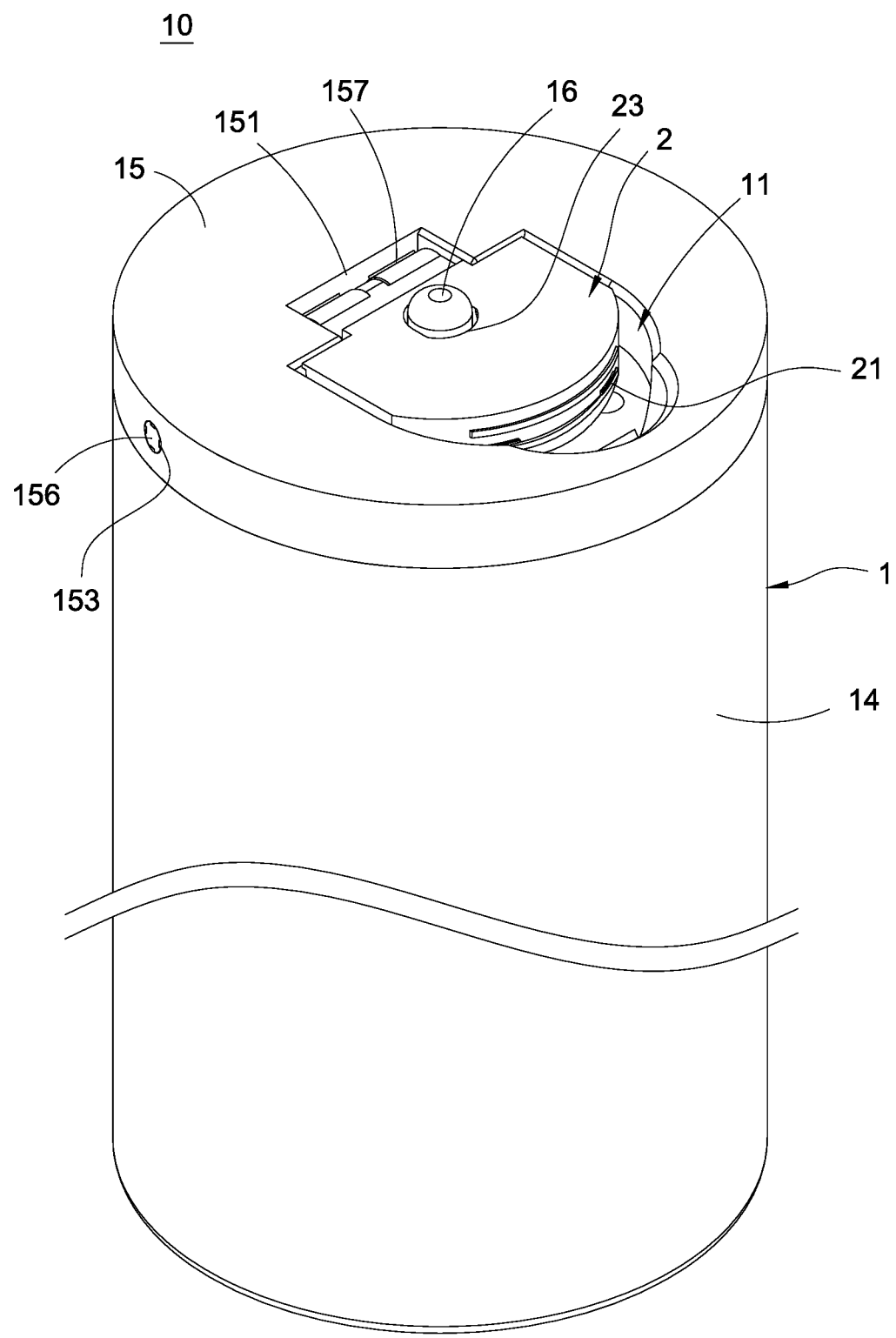
FIG. 8 is a perspective assembled view showing the rechargeable battery according to the second embodiment of the present invention.

Furthermore, FIGS. 1 to 6 show the rechargeable battery 10 according to the first embodiment of the present invention, and FIGS. 7 and 8 show the rechargeable battery according to the second embodiment of the present invention. The second embodiment is similar to the first embodiment. The difference between the first embodiment and the second embodiment is that the battery body 1 of the first embodiment is an AAA battery, and the battery body 1 of the second embodiment is an AA battery. Therefore, the rechargeable body 1 can be a D, C, AA, AAA, 9 volt, or a Nickel-Metal-Hydride battery; the present invention is not limited to the aforesaid embodiments.

Figure 2:
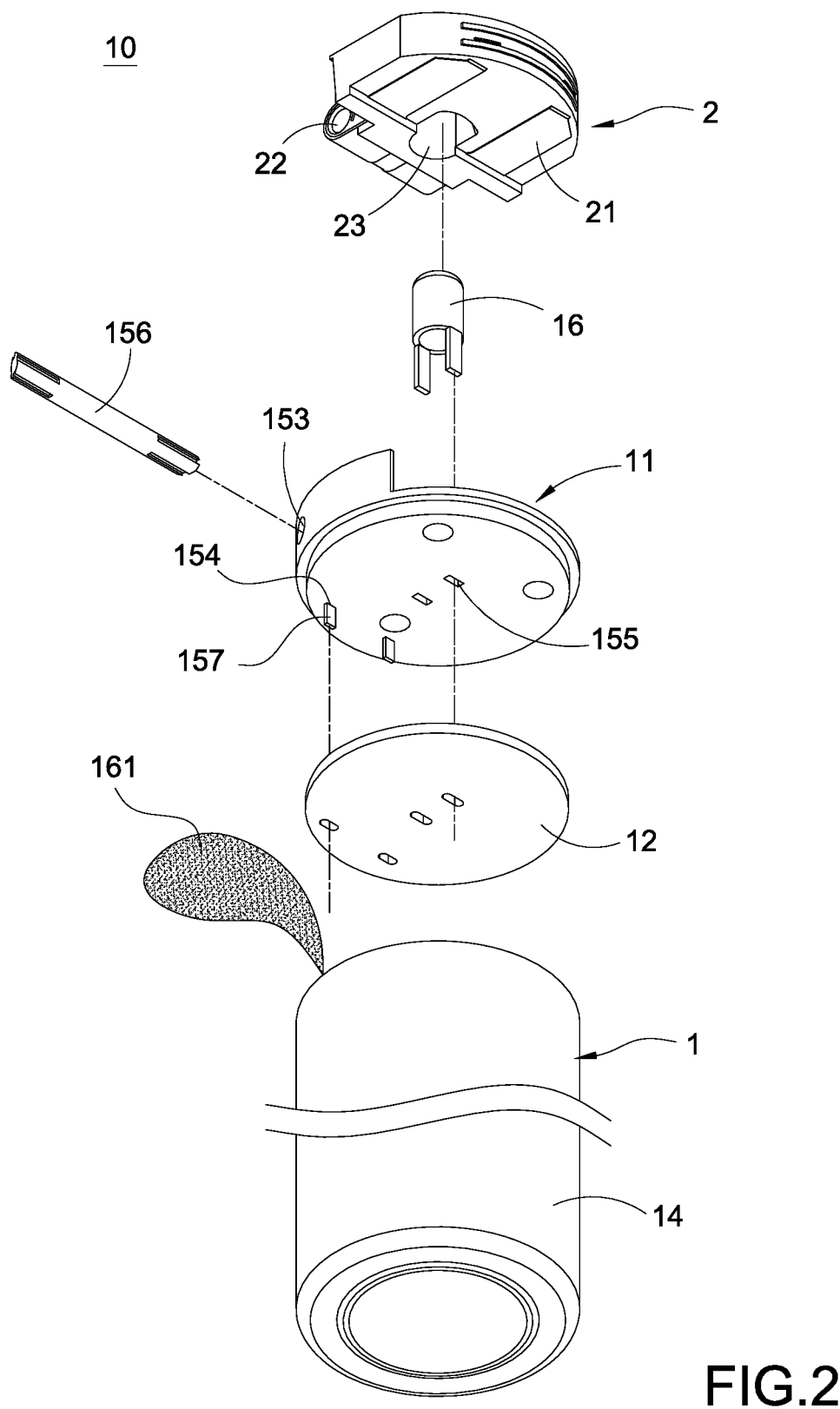
FIG. 2 is another perspective exploded view of the rechargeable battery according to the first embodiment of the present invention.
Figure 3:
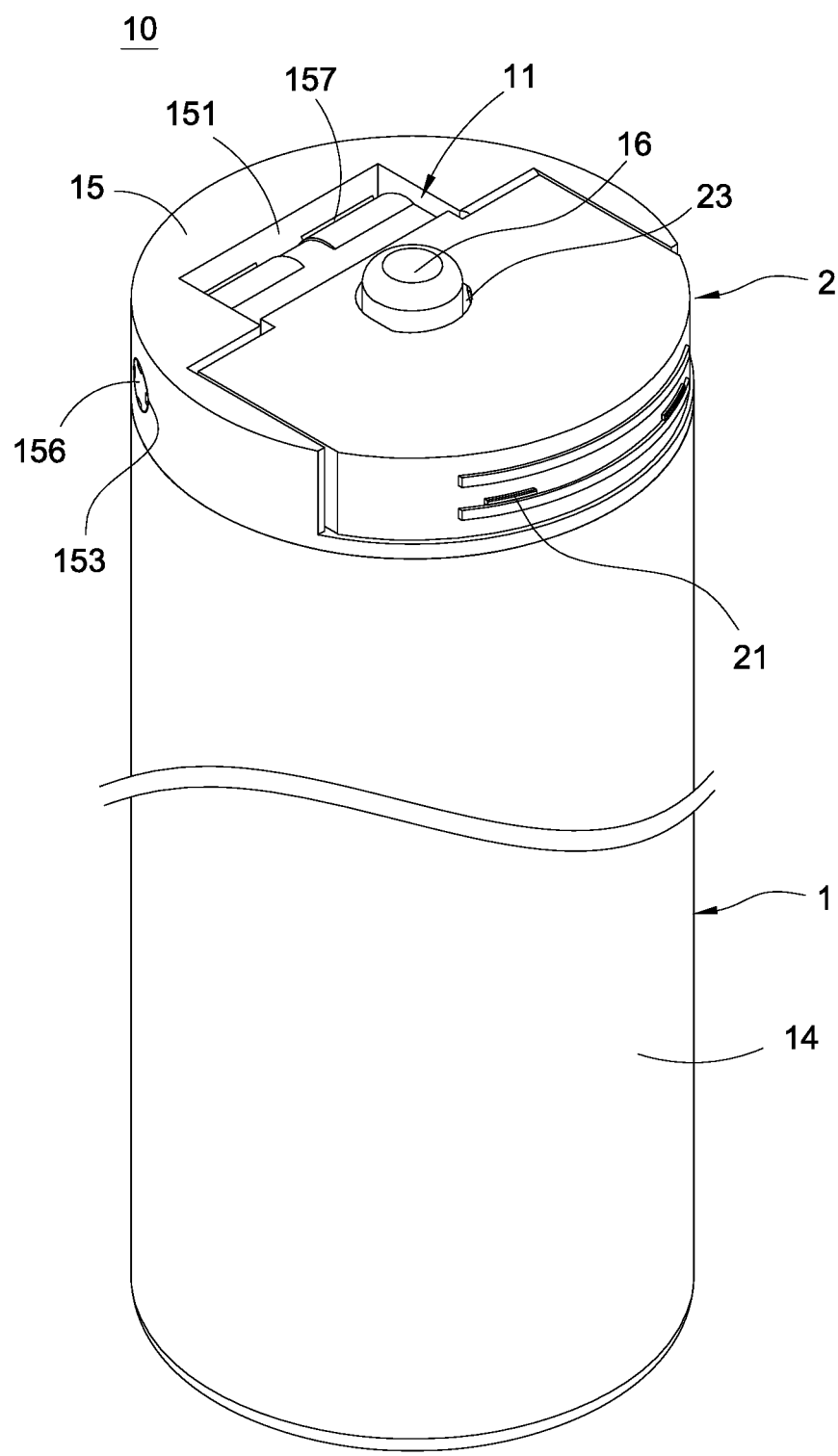
FIG. 3 is a perspective assembled view showing the rechargeable battery according to the first embodiment of the present invention.

Referring to FIGS. 1 to 3, in the rechargeable battery 10 of the present invention, the battery body 1 includes the recess 11, the circuit board 12 and the cell 13 are disposed inside the battery body 1, the circuit board 12 is electrically connected to the cell 13; the connector plug 2 is pivotally connected to the battery body 1 and electrically connected to the circuit board 12, the connector plug 2 is foldable to be received in the recess 11. Accordingly, the connector plug 2 is pivotally connected to the battery body 1 and is foldable to be received in the recess 11, so the battery body 1 can be charged by means of the connector plug 2 connected to an external power supply, thereby improving convenience in using the rechargeable battery 10.

Please refer to FIGS. 4 to 6 showing the rechargeable battery 10 in use. The connector plug 2 is pivotally connected to the battery body 1 and is foldable to be received in the recess 11. As shown in FIG. 4, when the connector plug 2 is folded and received in the recess 11, the rechargeable battery 10 looks like an ordinary rechargeable battery, and the rechargeable battery 10 can charge a portable electronic device. As shown in FIGS. 5 and 6, when the connector plug 2 protrudes from the recess 11, the connector plug 2 is electrically connected to circuit board 12 via the conductive plate 157, so the battery body 1 can be recharged by means of the connector plug 2 connected to the external power supply, thereby improving convenience in using the rechargeable battery 10.

Figure 9:
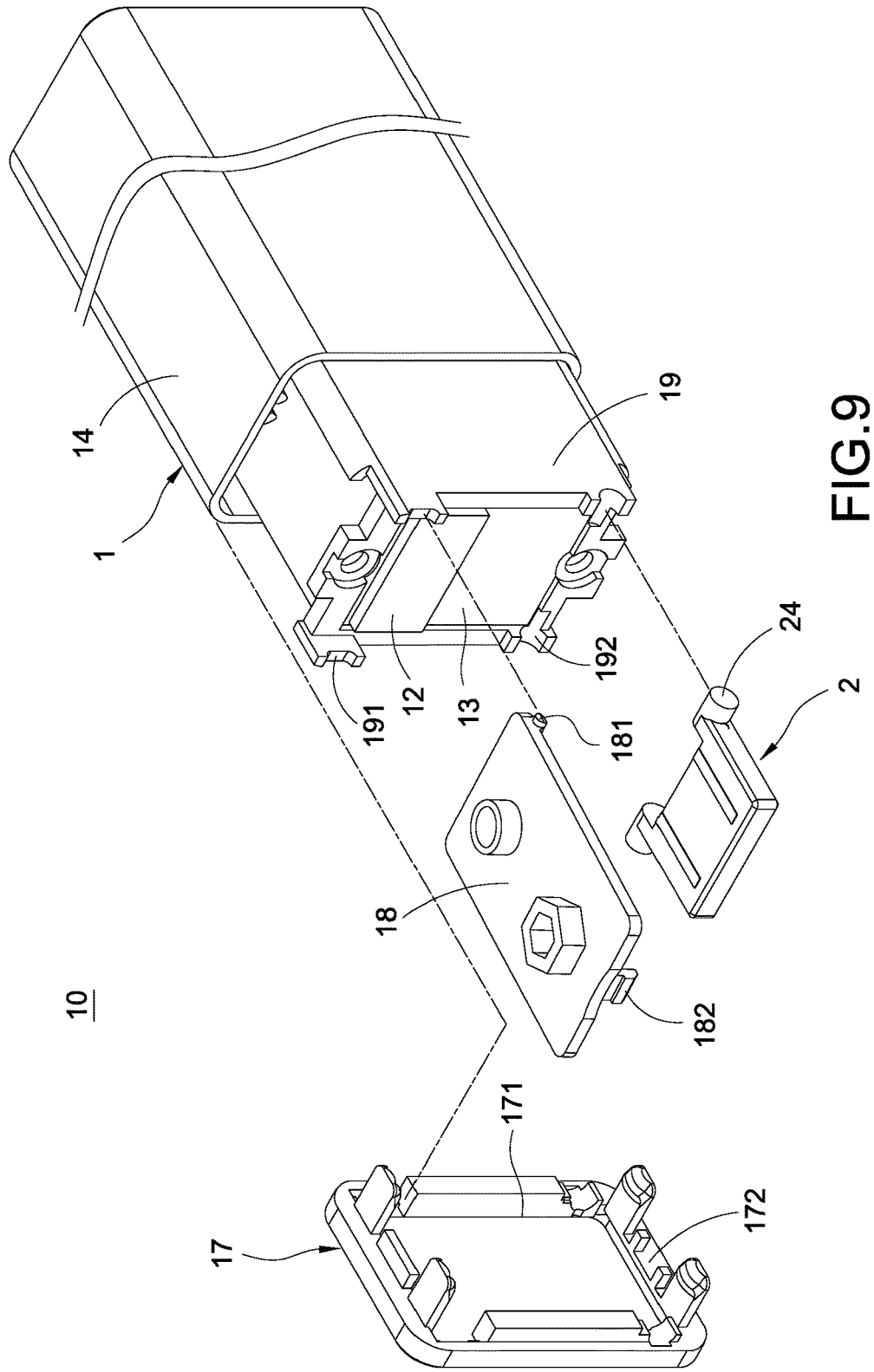
FIG. 9 is a perspective exploded view showing the rechargeable battery according to the third embodiment of the present invention.
Figure 10:
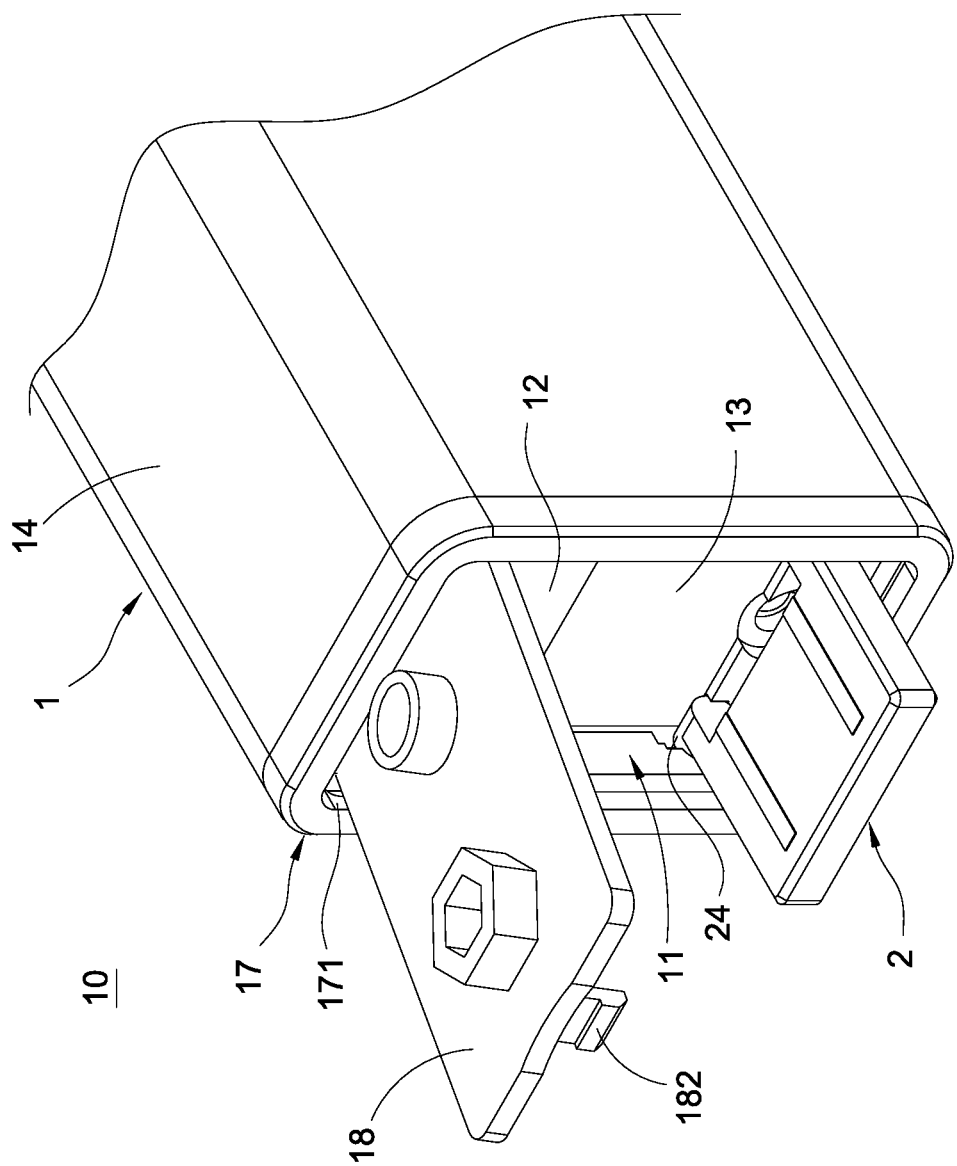
FIG. 10 is a perspective assembled view showing the rechargeable battery according to the third embodiment of the present invention.

Please refer to FIGS. 9 and 10 showing the third embodiment of the rechargeable battery 10 of the present invention. The third embodiment is similar to the first embodiment. The difference between the third embodiment and the first embodiment is that the connector plug 2 has a different pivot structure for connecting the battery body 1.

To be specific, the battery body 1 includes a sleeve 14, a covering member 17, an electrode plate 18, and a cell frame 19. The cell 13 is inserted through the cell frame 19 and positioned by the cell frame 19, the circuit board 12, the cell 13, and the cell frame 19 are accommodated in the sleeve 14, the covering member 17 and the cell frame 19 are assembled to each other to cover the circuit board 12 and the cell 13, the covering member 17 includes an open hole 171, the electrode plate 18 and the connector plug 2 are pivotally connected between the covering member 17 and the cell frame 19, and the recess 11 is formed between the open hole 171 and the cell 13.

Furthermore, two first curved blocks 191 extend from one side of at least one of the covering member 17 and the cell frame 19, two second curved blocks 192 extend from the other side, a first shaft 181 extends from the electrode plate 18, a second shaft 24 extends from the connector plug 2, the first shaft 181 is pivotally connected to the first curved block 191, and the second shaft 24 is pivotally connected to the second curved block 192, so that the electrode plate 18 is pivotally connected to one side of the covering member 17 and the cell frame 19, and the connector plug 2 is pivotally connected to the other side of the covering member 17 and the cell frame 19. The connector plug 2 and the circuit board 12 are disposed between the electrode plate 18 and the cell 13 and are adjacent and juxtaposed to each other.

Moreover, the covering member 17 includes an engagement groove 172 close to a surface of the cell 13, a fastener 182 extends from one end of the electrode plate 18 away from the first shaft 181 in a direction toward the cell 13, and the fastener 182 is engageable with the engagement groove 172.

Accordingly, as shown in FIG. 10, the fastener 182 is detached from the engagement groove 172, the electrode plate 18 is opened from the open hole 171 to expose the connector plug 2 and allow the connector plug 2 to be moved outwardly to protrude from the recess 11, so that the battery body 1 can be charged by means of the connector plug 2 connected to the external power supply, thus improving convenience in using the rechargeable battery 10.

Furthermore, the rechargeable body 1 can be a D, C, AA, AAA, 9 volt, or a Nickel-Metal-Hydride battery; the present invention is not limited to the present embodiment.

Figure 11:
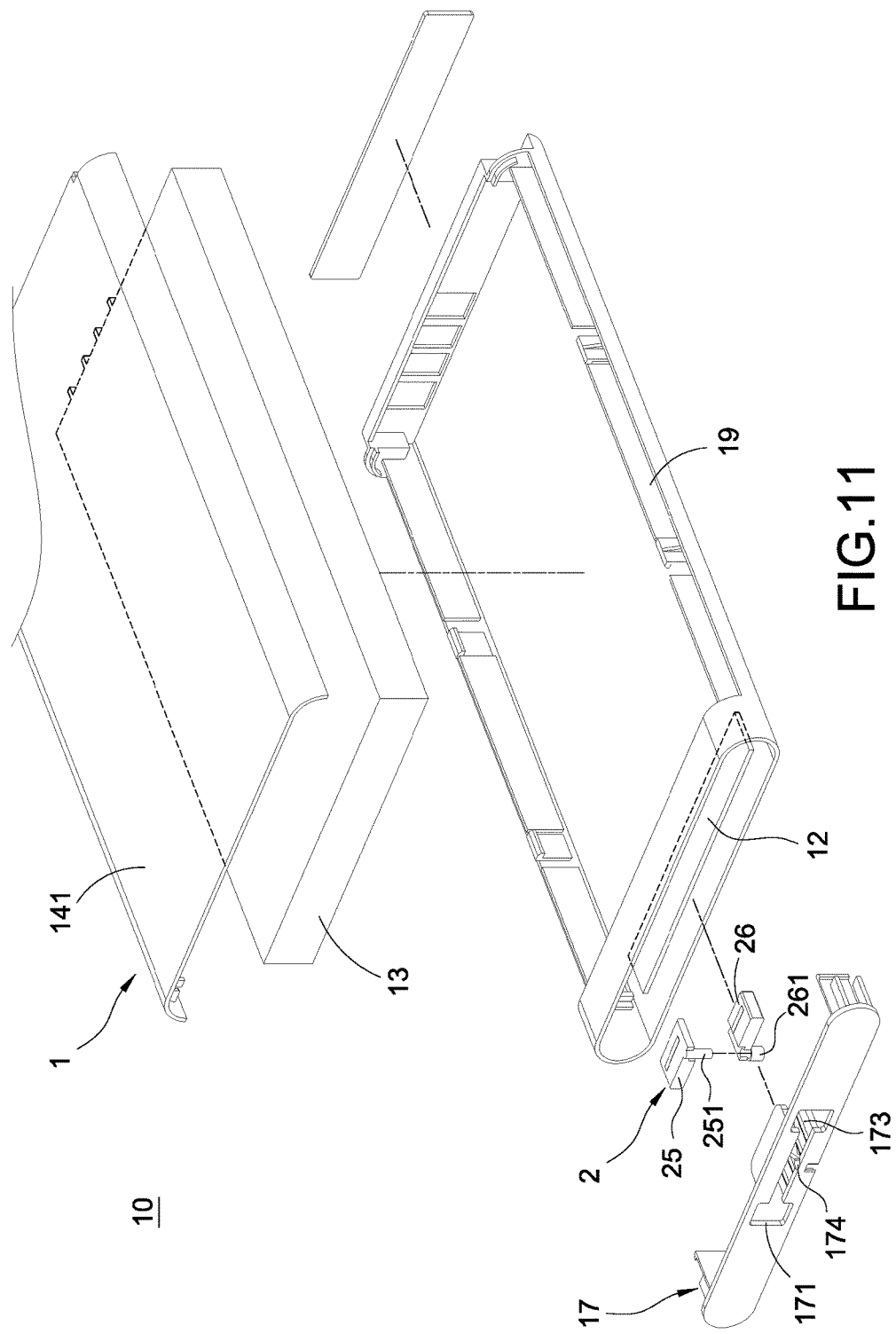
FIG. 11 is a perspective exploded view showing the rechargeable battery according to the fourth embodiment of the present invention.
Figure 12:
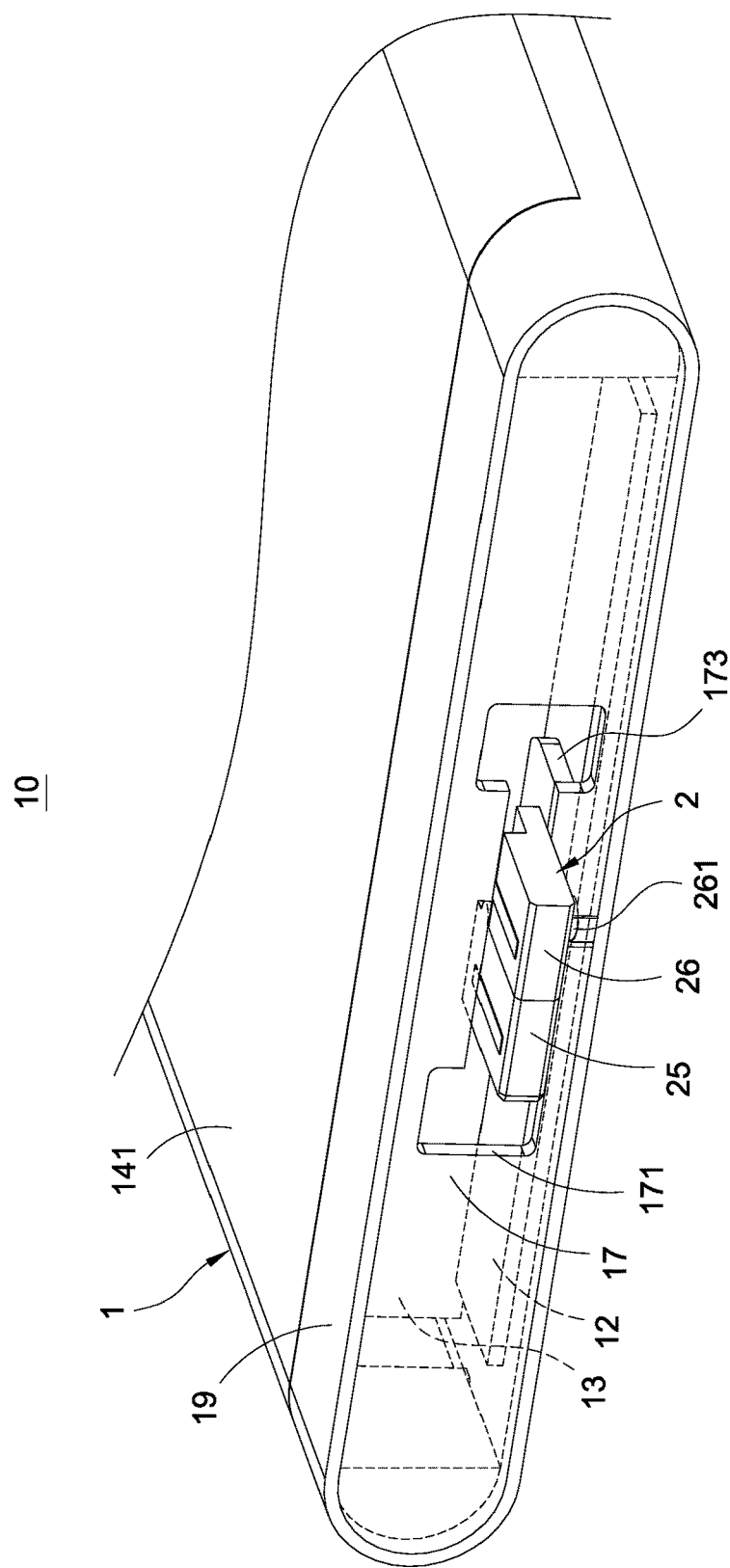
FIG. 12 is a perspective assembled view showing the rechargeable battery according to the fourth embodiment of the present invention.

Please refer to FIGS. 11 and 12 showing the fourth embodiment of the rechargeable battery 10 of the present invention. The fourth embodiment is similar to the first embodiment. The difference between the fourth embodiment and the first embodiment is that the connector plug 2 has a different pivot structure for connecting the battery body 1.

To be specific, the battery body 1 includes a battery cover 141, a covering member 17 and a cell frame 19, the cell 13 is inserted in the cell frame 19 and positioned by the cell frame 19, the battery cover 141 covers corresponding to an upper side of the cell frame 19, the circuit board 12 and the cell 13 are disposed between the battery cover 141 and the cell frame 19, the covering member 17 and the cell frame 19 are assembled to each other and cover the circuit board 12 and the cell 13, the covering member 17 includes an open hole 171 and an extension board 173 extending from the open hole 171 toward the cell 13, the connector plug 2 is pivotally connected to the extension board 173, and the recess 11 is formed between the open hole 171 and the cell 13.

Moreover, the connector plug 2 includes a left half connector plug 25 and a right half connector plug 26 connected to or detached from each other, a pivot rod 251 extends from the left half connector plug 25, the right half connector plug 26 includes a circular sleeve 261, the extension board 173 includes a pivot hole 174, and the pivot rod 251 is pivotally connected to the circular sleeve 261 and the pivot hole 174, so that the left half connector plug 25 and the right half connector plug 26 are pivotally connected to the extension board 173.

Therefore, as shown in FIG. 12, the left half connector plug 25 and the right half connector plug 26 can be moved outward via the open hole 171, so that the left half connector plug 25 and the right half connector plug 26 are connected to form the connector plug 2, and the connector plug 2 protrudes out of the recess 11, and thereby the battery body 1 can be charged by means of the connector plug 2 connected to the external power supply, and it is convenient to use the rechargeable battery 10.

In summary, the rechargeable battery of the present invention is neither disclosed by similar products nor used in public, has industrial applicability, novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

What is claimed is:

1. A rechargeable battery, comprising:
   a battery body, the battery body including a recess, a circuit board and a cell being disposed inside the battery body, the circuit board being electrically connected to the cell; and
   a connector plug pivotally connected to the battery body and electrically connected to the circuit board, the connector plug being foldable to be received in the recess,
   wherein the battery body includes a sleeve and a cover, the circuit board and the cell are accommodated in the sleeve, the cover is fitted on the sleeve and covers the circuit board and the cell, and the recess is openly disposed on the cover;
   wherein the cover includes an inner wall and a bottom corresponding to the recess, the inner wall includes a first pivot hole, the bottom includes a plurality of through holes, the connector plug includes a plurality of conductive terminals and a second pivot hole, the cover includes a pivot shaft and a plurality of conductive plates, the pivot shaft is pivotally connected to the first pivot hole and the second pivot hole, each of the conductive plates is fixedly inserted through each of the through holes and electrically connected to the circuit board, an end of each of the conductive plates is disposed corresponding to each of the conductive terminals and electrically connectable to each of the conductive terminals.

2. The rechargeable battery of claim 1, wherein the battery body further includes an electrode cap, the bottom includes a vent, the electrode cap is fixedly inserted through the vent and electrically connected to the circuit board, and the connector plug includes an opening which the electrode cap is inserted through and protrudes from.

3. The rechargeable battery of claim 1, wherein the battery body further includes a sealant, the sealant is filled between the circuit board and the cell, and the sealant and the sleeve together seal the cell.

4. The rechargeable battery of claim 1, wherein the connector plug is a USB plug or a HDMI plug.

5. A rechargeable battery, comprising:
   a battery body, the battery body including a recess, a circuit board and a cell being disposed inside the battery body, the circuit board being electrically connected to the cell; and
   a connector plug pivotally connected to the battery body and electrically connected to the circuit board, the connector plug being foldable to be received in the recess,
   wherein the battery body includes a sleeve and a cover, the circuit board and the cell are accommodated in the sleeve, the cover is fitted on the sleeve and covers the circuit board and the cell, and the recess is openly disposed on the cover;
   wherein the battery body further includes an electrode cap, the cover includes a bottom corresponding to the recess, the bottom includes a vent, the electrode cap is fixedly inserted through the vent and electrically connected to the circuit board, and the connector plug includes an opening which the electrode cap is inserted through and protrudes from.

* * * * *